Aug. 20, 1940.      B. H. CLEMENTS      2,212,436
PUMP
Filed June 16, 1938
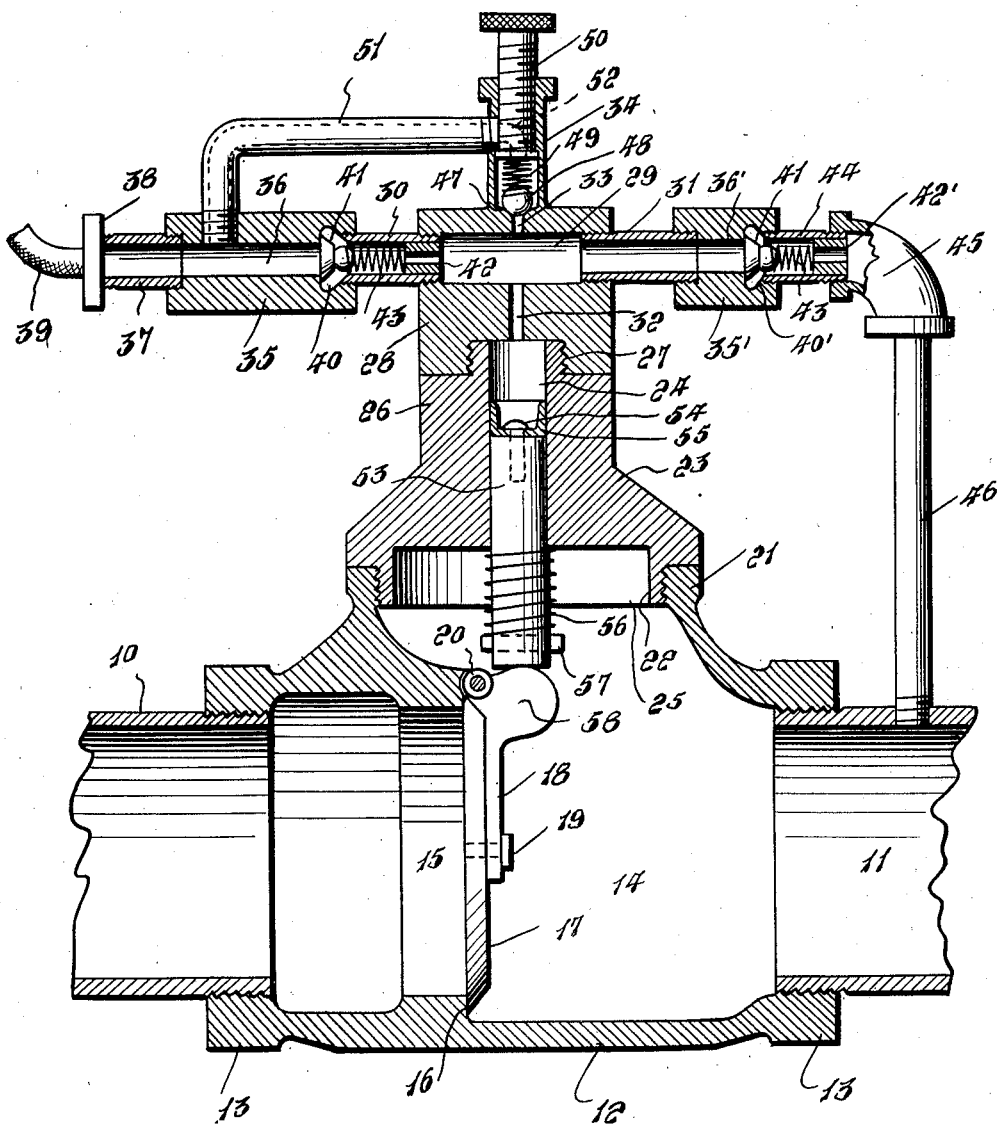
Inventor
Baron H. Clements
By L. F. Randolph
Attorney Patented Aug. 20, 1940

2,212,436

UNITED STATES PATENT OFFICE 2,212,436

PUMP

Baron H. Clements, Kilgore, Tex.

Application June 16, 1938, Serial No. 214,092

8 Claims. (Cl. 103—44)

This invention relates to an auxiliary pump adapted to be actuated by the surging pressure in a pipe line.

It is an aim of this invention to provide a pump mechanism adapted to be associated with a pipe line for oil, and with a supplementary conduit connected to a source of chemical supply and to the pipe line, for pumping predetermined quantities of the chemical into the pipe line through the action of the surging pressure of the oil.

Still a further object of the invention, is to provide a device having adjustable means whereby predetermined quantities of a chemical may be pumped into an oil conduit, and whereby the amount of oil forced through said conduit will govern the amount of chemical being pumped so that a predetermined ratio may be maintained.

A salient advantage of this device resides in the fact that adjustable means are provided to control the amount of the chemical pumped into the pipe line so that the proper amount of chemical will at all times be ejected into the oil.

Other objects and advantages of the invention will hereinafter become more fully apparent from the following description of the drawing which illustrates a preferred form of the invention, and wherein the invention is illustrated by a vertical central sectional view partly in elevation.

Referring more particularly to the drawing, 10 designates one section of a pipe line, which leads to a source of supply, which is preferably a well from which oil is being pumped through the pipe line, and 11 is the other section of the pipe line which leads to suitable storage tanks or the like.

Connected to sections 10 and 11 of the pipe line is the housing 12 having the internally threaded ends 13, at opposite ends thereof, to connect with the threaded ends of the pipes 10 and 11 and the passage 14 therethrough communicating with said pipes and having the restricted portion 15 adjacent the end 13 connected to the pipe 10. The inner end of the restricted portion 15 forms a valve seat 16 for a flap valve 17 to the outer side of which is secured the strip 18, by means of the fastening 19. Strip 18 extends upwardly beyond the valve 17 and is hinged at 20 to the upper inner end of the restricted portion 15.

Housing 12 is provided with an internally threaded opening at its top communicating with the hollow interior 14, and adapted to receive the reduced threaded end 22 of the upwardly extending member 23 which is provided with a longitudinal bore 24 communicating at its lower end with the enlarged recess 25 which opens into the housing 12.

Member 23 at its upper end, is provided with a reduced internally threaded tit 26, through which the upper end of the bore 24 extends and opens, to engage the internally threaded recess 27 in the lower end of the head 28, which is mounted above the member 23.

Head 28 adjacent its upper end is provided with a bore 29 disposed transversely of bore 24 and drilled at its opposite end to engage the externally threaded end of the pipes 30 and 31. Head 28 is also provided with a passage 32 connecting bores 24 and 29 and a passage 33 extending upwardly from bore 29 and opening into a tubular member 34 mounted on the top of head 28.

A tubular member 35 having a longitudinal bore 36, drilled at its opposite ends, is connected at one end to the free end of the pipe 30, and at its opposite end to a pipe 37, which in turn, is connected at its free end to a coupling 38 carried by the free end of a hose 39 which extends upwardly to communicate with a tank, not shown, containing a chemical.

Bore 36 is provided with an enlarged portion adjacent its end which connects the pipe 30, designated 40, provided with a converging end extending toward the bore of pipe 30 to form a housing for a valve 41, which normally seats against the back end of the housing 40 to close the passage through bore 36. Pipe 30 is provided with a tubular insert 42, at the end communicating with bore 29 against which is seated an expansion spring 43, the opposite end of which is in engagement with the valve 41 to normally hold it in a closed position.

Secured to the free end of the pipe 31, is a tubular member 35' corresponding in construction to the member 35, with the housing 40' at its outer end, or at the end opposite to pipe 31. A pipe 44 is connected, at one of its ends, to the free end of the tubular member 35', to communicate with the housing 40', and is provided at its opposite end with an insert 42' against which seats the spring 43' to retain the valve 41' in engagement with the flat end of the housing 40' to close bore 36'.

An elbow-shaped coupling 45 is connected to the last mentioned end of the pipe 44 and to one end of a downwardly extending pipe 46 which communicates with the pipe section 11.

Passage 33 at its upper end diverges outwardly to form a valve seat 47 for a ball valve 48, which is normally held in engagement therewith by an expansion spring 49 held under tension by a set screw 50 mounted in the threaded upper end of the tubular member 34. An L-shaped pipe 51 has one end communicating with bore 36 and member 35, and its opposite end communicating with the member 34 and with an angular shaped bore 52 in the set screw 50, as seen in dotted lines.

A piston 53 is slidably mounted in bore 24, which forms a cylinder therefore, and is provided at its top with a conventional cup-shaped ring 54 removably secured thereto by a screw 55, to prevent leakage between the periphery of the piston and wall of the cylinder. An expansion coil spring 56 is mounted on the lower end of piston 53 which projects below the member 23, with one end bearing against the lower end of member 23 and the opposite end engaging a pin 57, extending through the lower end of piston 53, to normally urge the piston downwardly or to a retracted position. Strip 18, at its upper end, is provided with an outwardly extending enlarged portion having a rounded edge forming a cam 58 against which the lower end of the piston 53 engages to normally hold the valve 17 in a closed position, as illustrated.

Assuming that the end 10 of the pipe line is connected to an oil well tubing from which oil is being pumped, by any suitable mechanism, through the pipe line, the surging pressure in the pipe line, caused by the stroke of said pumping mechanism which forces the oil into the pipe line, will strike the flap valve 17 to swing it open against the action of the expansion spring 56 to project or force piston 53 upwardly. As heretofore mentioned, hose 39 extends upwardly to connect with a tank containing a chemical, which is fed to the member 35 under gravity, and since the piston 53 on its upstroke has opened valve 41', when the surge of the pressure in pipe 10 diminishes the spring 56 will retract piston 53 to close valve 17 and at the same time create a vacuum in bore 29 and in the upper end of cylinder 24 which will open valve 41 to admit the chemical from bore 36, which will be ejected through bore 36' on the next upstroke of the piston 53. In this manner, a predetermined quantity of the chemical is pumped through pipe 46 into pipe 11 to mix with the oil on each pumping stroke of the oil well pump by the surging pressure transmitted to the valve 17 through the oil passing through the pipe line.

Valve 48 is provided in the top of the head 28 to regulate the amount of fluid dispensed into the pipe 46, and the tension on valve 48 may be regulated by adjusting set screw 50 so that the excess fluid between the valves 41 and 41' may be returned to bore 36 by passing upwardly through passage 33 into the tubular member 34, through bore 52 and into pipe 51 leading back to member 35. The amount of chemical pumped into pipe 11 on each stroke of the well pumping mechanism can thus be definitely regulated by adjustment of set screw 50 to vary the resistance of valve 48 relatively to valve 41'. The rounded edge of the cam member 58, which engages the lower end of piston 53 will project it when the valve 17 is swung outwardly, and will close the valve when the piston is retracted by the downward pressure of spring 56.

Various modifications and changes may obviously be made and are contemplated and the right is reserved to make such variations and changes as do not depart from the spirit and scope of the invention as hereinafter defined by the appended claims.

I claim as my invention:

1. A device of the class described comprising a pipe line forming a conduit for a surging liquid, a housing disposed therein and through which the liquid passes, a flap valve or impact member mounted to normally close the passage through said housing, a cylinder formed in said housing, said housing having a passage communicating with one end of said cylinder and disposed transversely thereto, valves disposed on opposite sides of said cylinder in the passage, a piston mounted in said cylinder and movable in one direction by said flap valve or impact member, and a spring associated with the piston and reacting against the flap valve or impact member for moving the piston in the opposite direction, said valves being alternately opened by the movement of said piston.

2. A pumping attachment for pipe lines comprising a pipe line for a surging fluid, a coupling connected to the pipe line and forming a passage for the fluid, an impact member mounted to close the inlet end of said coupling, a cylinder communicating with said coupling, a piston slidably mounted in said cylinder and provided with a spring to normally retain it in a retracted position in engagement with said impact member, said impact member being adapted to be intermittently moved to an open position by the surging pressure in the inlet end of the coupling to move the piston inwardly, said spring reacting to retract the piston and to move the impact member to a closed position, and a passage communicating, intermediate of its ends, with the head of said cylinder and having an inwardly opening valve at one end thereof and an outwardly opening valve at its opposite end.

3. A fluid pump comprising a pipe line for a surging flow, a housing mounted therein and containing a passage for conveying said flow, a flap valve for closing said passage, said flap valve being adapted to be intermittently opened by the surging pressure in the inlet end of the housing; a piston engaging said flap valve and provided with spring means normally urging it to a retracted position to close the flap valve, said piston being projected by the opening of said valve to thereby impart a reciprocating motion to the piston, a cylinder in which said piston is slidably mounted, a conduit connected to and communicating with the head of said cylinder, intermediate of its ends, an inwardly opening valve mounted in said conduit adjacent one of its ends, and an outwardly opening valve mounted in said conduit adjacent its opposite end, said last mentioned valves being disposed on opposite sides of the connection between the conduit and cylinder.

4. A device as in claim 3, said flap valve being provided with a hinge for pivotally mounting it, and said hinge having a cam portion to engage the outer end of said piston for alternately projecting the piston and closing the flap valve.

5. A device of the class described comprising a pipe line containing a surging flow of liquid, a coupling provided with a longitudinal passage, said coupling being connected to the pipe line with said passage forming a conduit for the liquid, said passage having a restricted portion at one end thereof, a flap valve pivotally connected to said portion, to close the inner end thereof, and mounted to open inwardly of the coupling, a head having one end connected to the top of said coupling and provided with a longitudinal bore, a piston slidably mounted in said bore, expansion spring means normally urging said piston outwardly and into engagement with said flap valve, a conduit connected intermediate of its ends to the opposite end of said head and having a restricted passage communicating with said bore, and a valve mounted in said conduit on each side of said restricted passage, one of said valves being mounted to open inwardly and the other valve being mounted to open outwardly, said flap valve being adapted to be intermittently opened by the surging pressure in the restricted end of said first mentioned passage for co-acting with said expansion spring to reciprocate the piston, and said valves being alternately opened by the movement of the piston.

6. In a fluid pump, a pipe line containing a surging fluid, a housing mounted in the pipe line and through which the fluid passes, said housing containing a passage, for the fluid, restricted at one end thereof, a valve mounted to normally close the restricted portion of the passage, a head projecting from the housing and containing a cylinder communicating therewith, a conduit formed in said head and communicating with said cylinder, valves mounted in said conduit, a piston slidably mounted in the cylinder for engaging said first mentioned valve, a spring for retracting said piston and for normally urging said first mentioned valve to a closed position, said first mentioned valve being intermittently opened by the surging pressure in the passage to project the piston and to combine thereby with said spring to produce a pumping operation in the conduit.

7. A fluid pressure pump comprising a pipe line containing a surging fluid, a coupling mounted therein and forming a passage for the fluid, said coupling having a restricted inlet end, an impact member pivotally mounted in said coupling to open inwardly thereof for closing said end, a fitting attached to said coupling having a cylinder opening into the coupling, a passage formed in said fitting and communicating intermediate of its ends with said cylinder, a spring pressed valve mounted in each end of said passage, one of said valves opening inwardly and one of said valves opening outwardly of said passage, a piston slidably mounted in said cylinder and extending into said coupling, and spring means for normally retracting said piston into engagement with the impact member for urging the impact member to a closed position, the surging pressure and the spring means combining to reciprocate the piston to produce a pumping action in said passage.

8. A device as in claim 7, said impact member having a cam to engage the piston, said cam being alternately actuated to project the piston and to move the impact member to a closed position.

BARON H. CLEMENTS.